United States Patent
Oh et al.

(10) Patent No.: US 9,746,019 B2
(45) Date of Patent: Aug. 29, 2017

(54) CYLINDRICAL OBJECT LOCKING DEVICE AND METHOD

(71) Applicant: ERICO International Corporation, Solon, OH (US)

(72) Inventors: Michael H.-S Oh, Twinsburg, OH (US); Peter B. Korte, Bay Village, OH (US); Raymond S. Laughlin, Middlefield, OH (US); Raymond M. Olle, Broadview Heights, OH (US); David Lyons, Mantua, OH (US); Ronald A. Jones, Cleveland Heights, OH (US); Nicholas J. Ambrogio, Highland Heights, OH (US)

(73) Assignee: ERICO INTERNATIONAL CORPORATION, Solon, OH (US)

( * ) Notice: Subject to any disclaimer, the term of this patent is extended or adjusted under 35 U.S.C. 154(b) by 22 days.

(21) Appl. No.: 14/676,023

(22) Filed: Apr. 1, 2015

(65) Prior Publication Data
US 2015/0275956 A1 Oct. 1, 2015

Related U.S. Application Data

(60) Provisional application No. 61/973,416, filed on Apr. 1, 2014.

(51) Int. Cl.
*F16B 37/08* (2006.01)

(52) U.S. Cl.
CPC ...... *F16B 37/0857* (2013.01); *F16B 37/0821* (2013.01)

(58) Field of Classification Search
CPC .. F16B 37/08; F16B 37/0821; F16B 37/0857; F16B 39/14
(Continued)

(56) References Cited

U.S. PATENT DOCUMENTS 3,352,341 A * 11/1967 Schertz ............... F16B 37/0864
411/270
4,616,967 A  10/1986 Molina
(Continued)

FOREIGN PATENT DOCUMENTS

JP   2005163998 A   6/2005

OTHER PUBLICATIONS

International Search Report and Written Opinion for corresponding application No. PCT/US2015/023803 mailed Jul. 6, 2015.

*Primary Examiner* — Roberta Delisle
(74) *Attorney, Agent, or Firm* — Quarles & Brady LLP

(57) ABSTRACT

A securement device includes a pair of plungers movable within a housing. The plungers act as quick lock mechanism to engage and secure a threaded rod (or other object) that passes into a hole that runs through the housing. The plungers are spring-biased to position themselves toward so as to provide a radially inward force, for example to engage a threaded rod or device in the through hole in the housing. A spring within the housing presses the plunger pieces toward a portion of the housing where the outer surfaces engage other surfaces to push the plungers inward. The device includes a disengagement feature or mechanism that is used to push the plunger pieces out of engagement with the threaded rod. The disengagement feature may include a disengagement tool, and may include wings, such as on the plungers or on carriers for the plungers, that protrude out of the housing.

20 Claims, 12 Drawing Sheets

(58) Field of Classification Search
USPC .................................................. 411/432, 433
See application file for complete search history.

(56) References Cited

U.S. PATENT DOCUMENTS

| | | | | |
|---|---|---|---|---|
| 4,781,507 | A | * | 11/1988 | Duenas ..................... B25B 5/10 269/185 |
| 5,378,100 | A | * | 1/1995 | Fullerton ............ F16B 37/0857 411/267 |
| 5,613,816 | A | * | 3/1997 | Cabahug ............. F16B 37/0857 411/267 |
| 5,618,143 | A | | 4/1997 | Cronin |
| 5,749,691 | A | * | 5/1998 | Campbell ........... F16B 37/0857 411/270 |
| 5,755,544 | A | * | 5/1998 | Muller .................. G01M 1/045 285/34 |
| 8,132,767 | B2 | | 3/2012 | Oh et al. |
| 8,434,725 | B2 | | 5/2013 | Oh et al. |
| 2002/0048499 | A1 | * | 4/2002 | Hoffmann ........... F16B 37/0864 411/432 |
| 2009/0324364 | A1 | * | 12/2009 | Smith .................. F16B 37/0857 411/433 |
| 2011/0182697 | A1 | * | 7/2011 | Smith ................. F16B 37/0828 411/433 |
| 2011/0280359 | A1 | | 11/2011 | Trice |
| 2012/0134764 | A1 | * | 5/2012 | Smith .................... F16B 39/32 411/267 |
| 2013/0243545 | A1 | | 9/2013 | Oh |

* cited by examiner

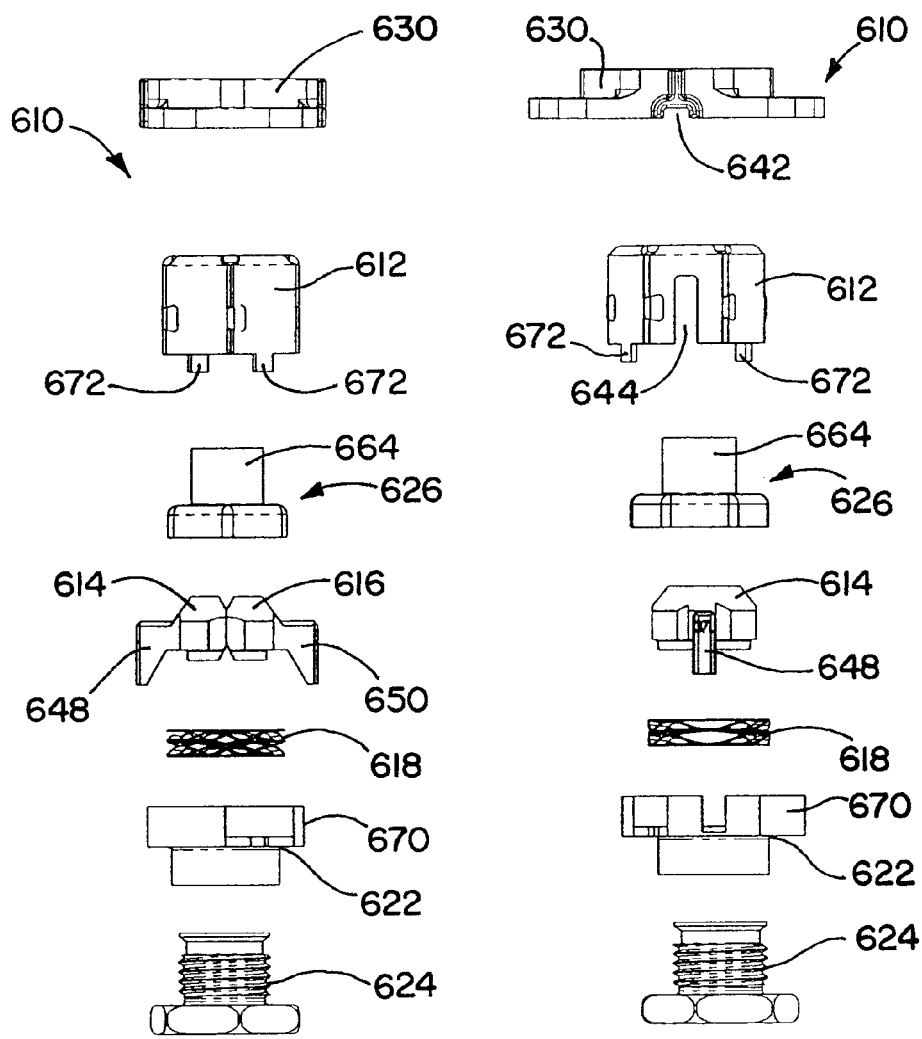
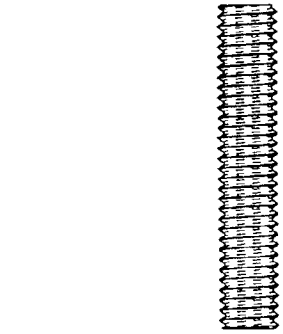
FIG. 16  FIG. 17

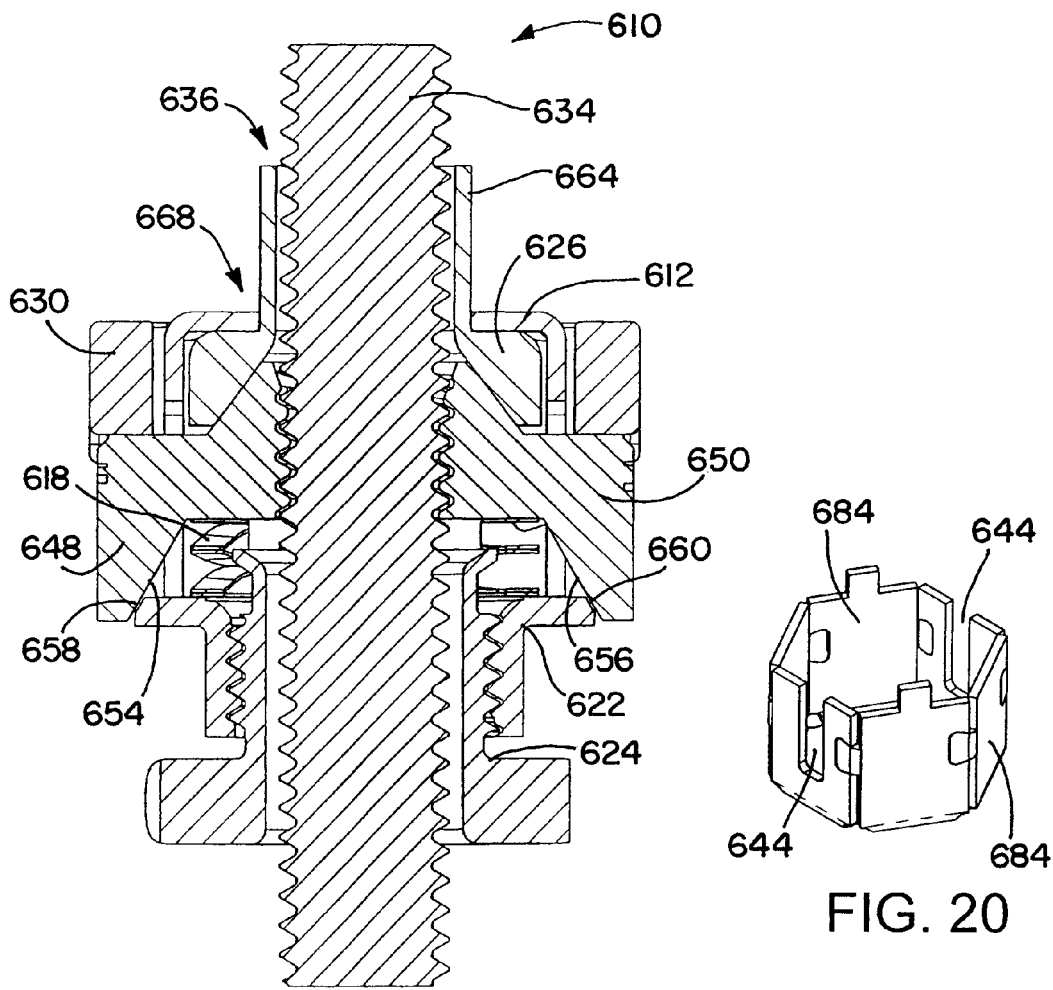
FIG. 18
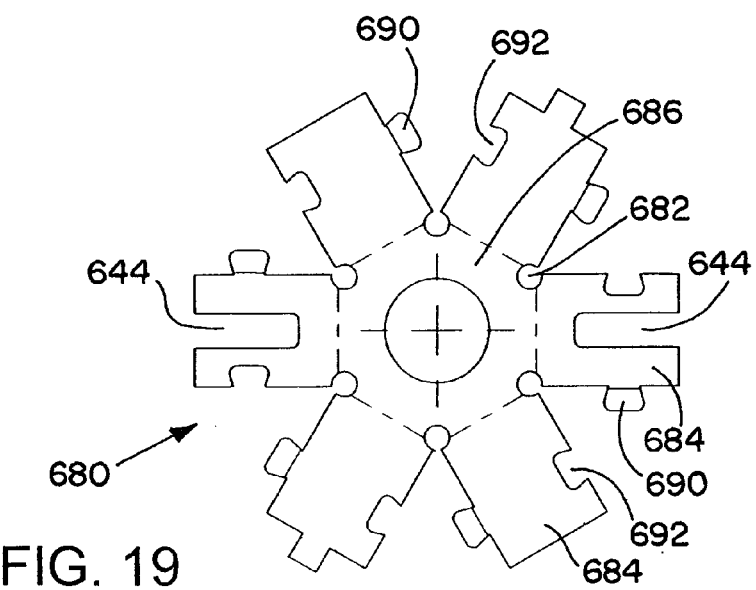
FIG. 20
FIG. 19

CYLINDRICAL OBJECT LOCKING DEVICE AND METHOD

This application claims priority of U.S. Provisional Application 61/973,416, filed Apr. 1, 2014, the entire disclosure of which is incorporated by reference herein.

BACKGROUND OF THE INVENTION

Technical Field of the Invention

The invention is in the field devices for locking onto threaded rods or other cylindrical objects.

Description of the Related Art

ERICO International Corporation sells the CADDY® SPEED LINK product family as a quick cable locking system that provides a means to suspend static loads from ceilings, structures, and sub-structures. However, prior items in the SPEED LINK product family have not included any quick threaded rod locking devices.

In recent years, installers in the field are increasingly using pre-fabricated, sub-assembled parts in order to maximize their installation labor savings. When installers install the pre-fabricated sub-assemblies on ceilings, structures, and sub-structures in the field, the installers cannot assemble them together without rotating threaded rod unless they disassemble the pre-fabricated sub-assemblies, because the threaded rod is a part of the pre-fabricated sub-assemblies. With the conventional beam clamps, conventional anchor bolts, and conventional strut nuts, the threaded rods have to be rotated into internal threads on the mating parts such as beam clamps, anchor bolts and strut nuts.

ERICO International Corporation is owner of U.S. Pat. Nos. 8,132,767 and 8,434,725, and U.S. Patent Publication US 2013/0243545 A1, all of which relate to threaded rod locking devices.

SUMMARY OF THE INVENTION

According to aspects of the invention, a threaded rod securement includes: a housing having a through hole (or bore) therethrough, for receiving a threaded rod therein; and a threaded rod locking mechanism. The threaded rod locking mechanism includes: plunger pieces movable within the housing to selectively engage threads of the threaded rod placed into the through hole; and a spring within the housing providing a spring force biasing the plunger pieces toward one end of the housing, for engaging the plunger pieces with the threaded rod. The securement may include one or more of the following features: the housing is a stamped metal housing; the housing is a hexagonal housing; the housing is a polygonal housing; the housing has a tapered inner surface; the tapered inner surface is formed by stamping; the tapered inner surface is formed by use of a die; the securement further include a back plate that retains the plunger pieces and the spring within the housing; the back plate is secured to the housing; the back plate is secured to the housing using folded-over tabs of the housing; the securement further includes one or more plunger carriers (inserts) having tapered inner surfaces for engaging the plunger pieces; the plunger pieces have tapered outer surfaces; the plunger pieces engage the housing with a keyed engagement; the spring is a wave spring; the securement further includes a lock nut; the lock nut has a through hole that allows the threaded rod to pass through; the lock nut selectively threadedly engages the back plate to selectively lock the plunger pieces in engagement with the threaded rod; the plunger pieces have threaded inner surfaces; the plunger pieces have toothed inner surfaces; the plunger pieces and the housing are made of metal; the plunger pieces and the housing are made of steel; the securement includes a jaw deactivation feature allowing a user to manually disengage the plunger pieces from the threaded rod, to allow an inserted threaded rod to be quickly repositioned in either direction; the jaw deactivation feature includes wings on plunger carriers that extend out of slots in the housing; the jaw deactivation feature includes release tabs; the release tabs are bent metal pieces; the release tabs engage the plunger pieces within the housing; the release tabs extend out of the housing to allow engagement by the user; the release tabs can be pulled up to thereby also disengage the plunger pieces from the threaded rod; and/or the tapered inner surface (of the carrier(s) or the housing) are one or more conical surfaces.

According to an aspect of the invention, a threaded rod securement device includes: a housing having a through hole therethrough, for receiving a threaded rod therein; and a threaded rod locking mechanism. The threaded rod locking mechanism includes: plungers movable within the housing to selectively engage threads of the threaded rod placed into the through hole; and a spring within the housing providing a spring force biasing the plungers toward one end of the housing, for engaging the plungers with the threaded rod. The threaded rod locking mechanism includes a disengagement feature that includes wings that protrude from the body. The wings slide relative to the body. Sliding of the wings relative to the body in an axial direction moves the plungers radially outward to disengage the threaded rod that is within the housing.

According to an embodiment by any other paragraph(s) of this summary, the wings are parts of the plungers.

According to an embodiment by any other paragraph(s) of this summary, the plungers together correspond in shape to a recess within the housing, and the wings protrude radially from the centers of the respective plungers.

According to an embodiment by any other paragraph(s) of this summary, the device includes a back plate at one end of the housing, with the spring between the back plate and the plungers.

According to an embodiment by any other paragraph(s) of this summary, the sliding of the wings in the axial direction engages surfaces of the wings with cam surfaces of the back plate, to move the plungers radially outward.

According to an embodiment by any other paragraph(s) of this summary, the surfaces of the wings and the cam surfaces are sloped surfaces, angled at nonzero angles to both the axial direction and the radial direction.

According to an embodiment by any other paragraph(s) of this summary, the device includes a lock nut that threadedly engages the back plate, wherein the lock nut is threadable into the back plate to engage the plungers to lock the plungers in place, preventing disengagement of the plungers from a threaded rod that has been inserted into the securement device.

According to an embodiment by any other paragraph(s) of this summary, the lock nut has a flared portion for retaining the lock nut on the back plate, preventing the lock nut from being completely disengaged from the back plate.

According to an embodiment by any other paragraph(s) of this summary, the back plate is secured to the housing using folded-over tabs of the housing.

According to an embodiment by any other paragraph(s) of this summary, the housing is a stamped/deep drawn metal housing.

According to an embodiment by any other paragraph(s) of this summary, the housing has a hexagonal cross-sectional shape.

According to an embodiment by any other paragraph(s) of this summary, the device includes an insert within the housing, wherein the insert has a conical surface that engages the plungers to urge the plungers radially inward.

According to an embodiment by any other paragraph(s) of this summary, the plungers have textured inner surfaces for engaging the threaded rod.

According to an embodiment by any other paragraph(s) of this summary, the wings pass through slots in the housing.

According to an embodiment by any other paragraph(s) of this summary, the device includes a disengagement tool around the housing that is able to slide relative to the housing in the axial direction.

According to an embodiment by any other paragraph(s) of this summary, the disengagement tool selectively engages the wings to move the plungers.

According to an embodiment by any other paragraph(s) of this summary, the disengagement tool is made of plastic or other materials.

According to another aspect of the invention, a threaded rod securement device includes: a housing having a through hole therethrough, for receiving a threaded rod therein; a threaded rod locking mechanism, wherein the threaded rod locking mechanism includes: plungers movable within the housing to selectively engage threads of the threaded rod placed into the through hole; and a spring within the housing providing a spring force biasing the plungers toward one end of the housing, for engaging the plungers with the threaded rod; and a disengagement tool around the housing that is able to slide relative to the housing in an axial direction that is along an axis of the housing, with the sliding in the axial direction radially moving the plungers radially outward, away from the axis of the housing.

According to an embodiment by any other paragraph(s) of this summary, the disengagement tool interacts with wings of the plungers that protrude from the housing.

According to an embodiment by any other paragraph(s) of this summary, the housing is a stamped/deep drawing metal housing.

According to another aspect of the invention, a securement device includes: a housing having a through hole therethrough, for receiving a cylindrical object therein; and a locking mechanism. The locking mechanism includes: plungers movable within the housing to selectively clamp the cylindrical object placed into the through hole; and a spring within the housing providing a spring force biasing the plungers toward one end of the housing, for engaging the plungers with the cylindrical object. The locking mechanism includes a disengagement feature that includes wings that protrude from the body. The wings slide relative to the body. Sliding of the wings relative to the body in an axial direction moves the plungers radially outward to disengage the cylindrical object that is within the housing.

According to yet another aspect of the invention, a securement device includes: a housing having a through hole therethrough, for receiving a cylindrical object therein; a locking mechanism, wherein the locking mechanism includes: plungers movable within the housing to clamp the cylindrical object placed into the through hole; and a spring within the housing providing a spring force biasing the plungers toward one end of the housing, for engaging the plungers with the cylindrical object; and a disengagement tool around the housing that is able to slide relative to the housing in an axial direction that is along an axis of the housing, with the sliding in the axial direction radially moving the plungers radially outward, away from the axis of the housing.

According to still another aspect of the invention, a securement device includes: a housing having a through hole therethrough, for receiving a cylindrical object therein; a locking mechanism, wherein the locking mechanism includes: plungers movable within the housing to selectively clamp the cylindrical object placed into the through hole; and a spring within the housing providing a spring force biasing the plungers toward one end of the housing, for engaging the plungers with the cylindrical object; a back plate at one end of the housing, with the spring between the back plate and the plungers; and a lock nut that threadedly engages the back plate, wherein the lock nut is threadable into the back plate to engage the plungers to lock the plungers in place, preventing disengagement of the plungers from a threaded rod that has been inserted into the securement device. The lock nut has a flared portion for retaining the lock nut on the back plate, preventing the lock nut from being completely disengaged from the back plate.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

FIG. 16 is an exploded view of the device of FIG. 15.

FIG. 17 is another exploded view of the device of FIG. 15.

FIG. 18 is a side cross-sectional view of the device of FIG. 15.

FIG. 19 is a plan view of a blank used to make the housing of the device of FIG. 15.

FIG. 20 is an oblique view of the housing made from the blank of FIG. 19.

DETAILED DESCRIPTION

A locking or securement device, for securing a threaded rod or other cylindrical object, includes a pair of plunger pieces (plungers) within a housing. The plunger pieces act as quick lock mechanism to engage and secure a threaded rod that passes into a hole that runs through the housing. The plunger pieces have tapered outer surfaces and are spring-biased to position themselves toward so as to provide a radially inward force, for example to engage a threaded rod or device in the through hole in the housing. A spring within the housing presses the plunger pieces toward a portion of the housing where the outer surfaces engage other surfaces to push the plunger pieces (or plungers) inward, with the spring located between the plunger pieces and a back plate or cap that closes off part of a wide end of the tapered bore. The plunger pieces have internally threaded, toothed, or otherwise textured surfaces that engage threads on a threaded rod that is inserted into the bore, between the plunger pieces. The device includes a disengagement feature or mechanism that is used to push the plunger pieces out of engagement with the threaded rod. The disengagement feature may include a disengagement tool that is around the housing, and movable in an axial direction relative to the housing. The disengagement feature alternatively or also may include wings, such as on the plunger pieces or on carriers for the plunger pieces, that protrude out of the housing, and have cam surfaces that engage parts of the back plate or cap, to move the plunger pieces radially outward. The locking device may also have a threaded device, such as a lock nut, to lock the plunger pieces in place and prevent them from unwanted disengagement from the threaded rod. The housing may be a stamped/deep drawn part, with an insert inside it that provides a sloped or tapered radially inner surface for engaging the plungers, to move the plungers radially inward to engage the threaded rod.

Figure 1:
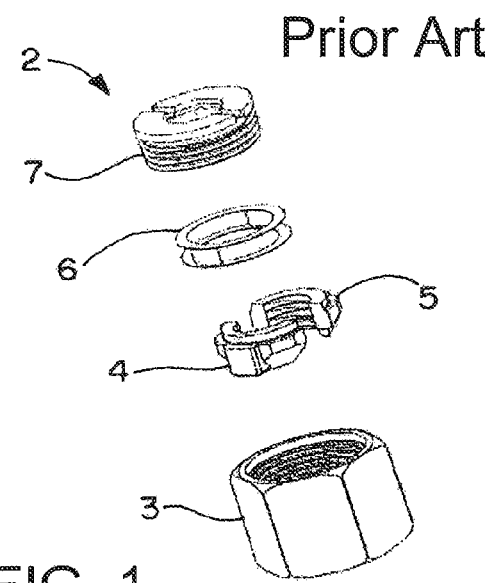
FIG. 1 is an exploded view of an existing threaded rod securement device.

FIG. 1 shows an existing rod lock device 2. The device 2 includes a cold headed cartridge housing 3, a pair of plungers 4 and 5, a wave spring 6, and a back plate 7. The plungers 4 and 5 are movable within the housing 3 to selectively engage a threaded rod that is inserted into a central hole in the device 2. The housing 3 has a tapered bore, which engages outer surfaces of the plungers 4 and 5 to move the plungers 4 and 5 radially inward and outward as the plungers 4 and 5 move axially within the bore. Further details regarding this device may be found in U.S. Patent Publication US 2013/0243545 A1, which is incorporated by reference in its entirety.

The cartridge housing 3 for the device 2 in FIG. 1 may be manufactured using the method of cold heading, which requires post processing to complete a finished component. While this manufacturing method has its advantages, there are alternative manufacturing methods of producing a housing assembly, back plates, and even plungers through the use of metal stamping/deep drawing or even zinc die casting. At least some of these methods have not been employed previously in making such parts. Stamping or deep drawing of the housing would minimize the amount of material steel needed for the housing, as well as the post-production secondary operations, thus reducing the cost of the housing itself. Stamping/deep drawing may also result in better quality control and production lead times. Many advantages of a stamped configurations, and other improvements, are outlined in the following paragraphs.

In contrast to what is shown in the device 2, a stamped/deep drawn cartridge body could eliminate several manufacturing steps, saving cost, by eliminating the internal thread on the housing and the external thread on the back plate, since the top edge of the housing could be swaged (similar to rolling the edge on a rivet), to hold the back plate in place.

Figures 2, 3:
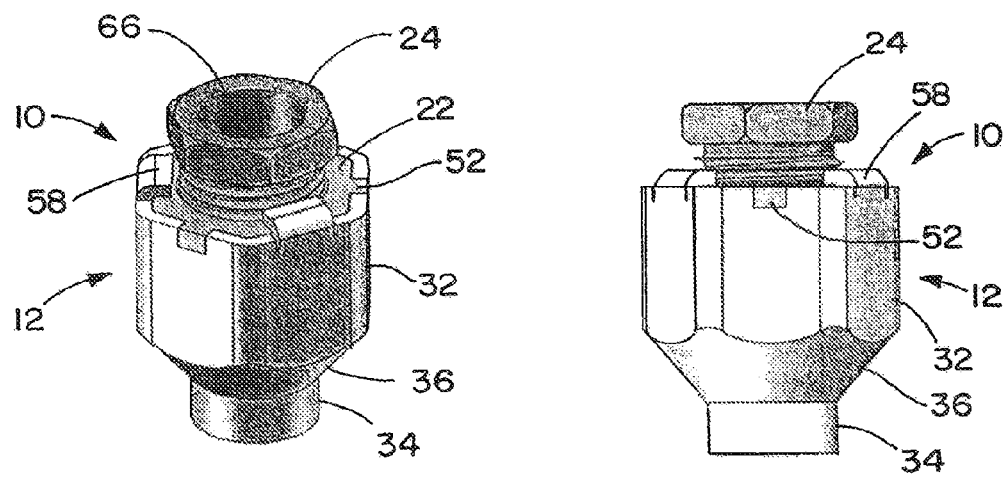
FIG. 2 is an oblique view of a securement device according to an embodiment of the invention.
FIG. 3 is a side view of the device of FIG. 2.

FIGS. 2 and 3 show a securement device 10 with a stamped cartridge assembly. Cross-sectional and exploded views of the device 10 shown in FIGS. 4 and 5, respectively. The device 10 is described below in terms of securing a threaded rod. However the device 10 (and the other devices described below) can be used for securing other types of cylindrical objects, such as unthreaded rods or wires. All of the securement devices described herein should be understood as capable of securing a broad range of cylindrical objects within them, with the threaded rods shown being only one example of such an object.

The device 10 includes a stamped housing 12, plungers 14 and 16 that fit into the housing 12, and a spring 18 that is also with the housing 12. In the illustrated embodiment the spring 18 is a wave spring, and it is located the between a back plate or end cap 22 that fits into an open end of the housing 12. The lock nut 24 threads into a central internally-threaded hole 26 in the back plate 22.

The stamped housing 12 has a relatively-wide main body 32 with a hexagonal shape, and a relatively-narrow hub 34 with a circular cross-section. A transition portion 36 between the body 32 and the hub 34 provides a tapered, sloped shape that allows a transition between the body 32 and the hub 34. The transition 36 provides a sloped inner surface that engages the plungers 14 and 16, the push the plungers 14 and 16 radially inward toward a central axis 40 of a bore or through hole 42 of the device 10 (or the housing 12), into which a threaded rod is inserted.

The spring 18 biases the plungers 14 and 16 to be pushed toward the transition 36 of the housing 12. The plungers 14 and 16 together make a general hexagonal shape that fits into the housing body 32. The lower portions of the plungers 14 and 16 have rounded outer surfaces of a suitable shape for engaging the rounded (circular conical) inner surface of the transition portion 36. The plungers 14 and 16 have respective textured inner surfaces 44 and 46 for engaging the threaded surface of a threaded rod inserted into the bore 42. The textured inner surface 44 and 46 may be threaded surfaces or toothed surfaces, for example.

At their tops, the plungers 14 and 16 have ridges protruding upward from their top surfaces. The ridges, which are curved and border the circular opening between the plungers 14 and 16 (along the bore 42), add in keeping the spring 18 in proper position on top of the plungers 14 and 16. This keeps the spring 18 from interfering with insertion or movement of a threaded rod into the bore 42.

The back plate 22 has a series of tabs 52 around its circumference. The tabs 52 fit into corresponding notches 54 in the housing body 32. The interaction between the tabs 52 and the notches 54 aids in keeping the back plate 22 in place as the lock nut 24 is threaded into the back plate's threaded hole 26. The engagement of the tabs 52 in the notches 54 also controls the depth of the back plate 22 within the housing body 32. That the tabs 52 engage the notches 54 aids in securing the plate 22 to the housing 12.

The back plate 22 is held to the housing 12 by a series of axially-extending tabs 58 on the housing body 32. The tabs 58 are folded over onto the back plate 22 after installation of the back plate 22, to hold the back plate 22 in place. The folding over of tabs 58 on the housing 12, locks the back plate 22 and the internal components of the device 10 into place In the illustrated embodiment there are three tabs 58, alternating with the three notches 54 in the body 32. Many other configurations are possible.

The back plate 22 contrasts with some previous threaded rod securement devices in which the back plate was externally threaded, to engage internal threads on a housing. Removal of the internal threading would reduce processing steps on the individual components and increase assembly speed and reliability as the device (the back plate 22 and the housing 12) cannot unscrew.

The lock nut 24 has an externally-threaded body 64 that engages the threaded hole 26 of the back plate 22. The lock nut 24 has a central hole 66 along its axis, to allow a threaded rod to pass through the lock nut 24 to enter or be removed from the bore 42.

Figure 4:
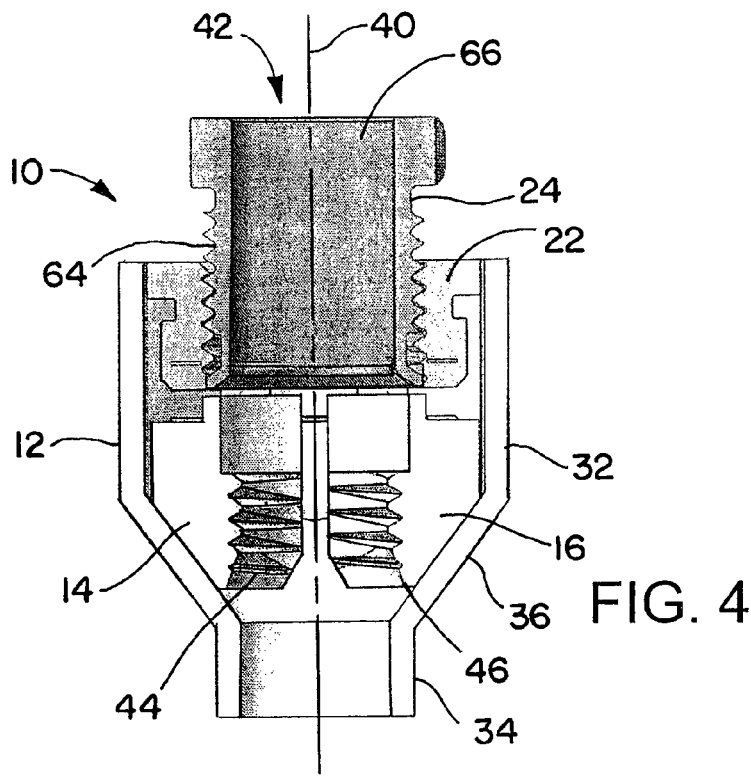
FIG. 4 is a side cross-sectional view of the device of FIG. 2.
Figure 5:
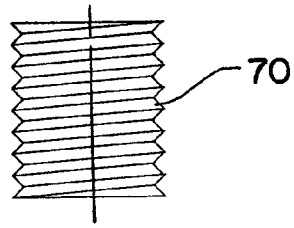
FIG. 5 is an exploded view of the device of FIG. 2.
Figure 5:
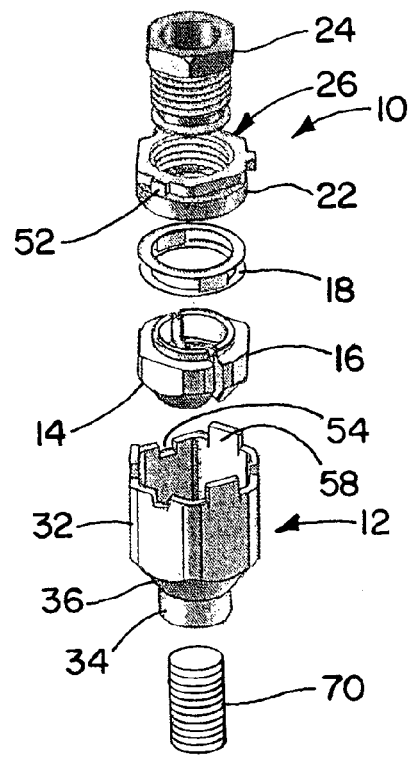

Prior to insertion of a threaded rod 70, the plungers 14 and 16 are in a free condition, with the two plungers 14 and 16 together as shown in FIG. 4. When the threaded rod 70 is inserted through the hub 34, and pushes through the plungers 14 and 16, the inserted end of the threaded rod 70 first pushes on chamfers at the bottom of the two plungers 14 and 16. The pushing of the rod 70 into the plunger set pushes the plungers 14 and 16 apart, further opening a space or opening between the plungers 14 and 16. This allows the threaded rod 70 to pass into or through the plungers 14 and 16, between the plungers 14 and 16. The plungers 14 and 16 are also moved longitudinally (axially) along the bore 42 in a direction away from the hub 34, and toward the wide end housing 12, against the spring biasing force from the spring 18. The movement of the plunger set axially brings it into a wider area inside the housing, allowing the plungers 14 and 16 to separate from each other.

When the rod 70 is released, the spring force pushes the plungers 14 and 16 back toward the hub 34. When the plungers 14 and 16 reach the transition 36, the plungers 14 and 16 are directed radially inward against the threaded rod 70, clamping the threaded rod 70 to the device 10.

The device 10, and aspects of it, provide numerous and varied advantages, relative to certain earlier devices. For example, the housing 12 is stamped/deep drawn, instead of headed. The ability to stamp or deep draw the cartridge housing on progressive/transfer die tooling would remove the need for any post processing of parts off of the tool, thus reducing part cost and dimensional variability. A stamped cartridge housing 12 also allows for the potential to reduce the amount of material used in the housing, thus reducing material cost, and to an extent the shipping cost as the assembled part would be lighter.

Figure 6:
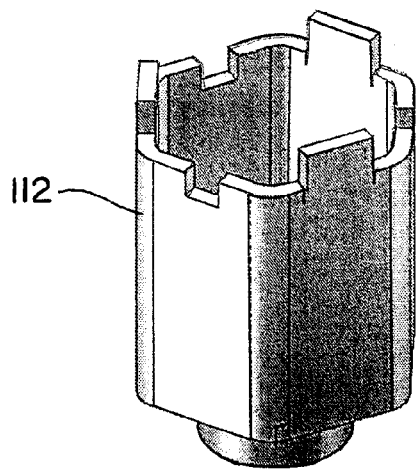
FIG. 6 is an oblique view of an alternate stamped/deep drawn housing for a threaded rod securement device.
Figure 7:
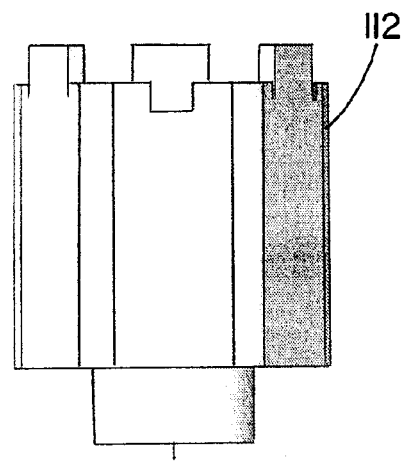
FIG. 7 is a side view of the housing of FIG. 6.
Figure 8:
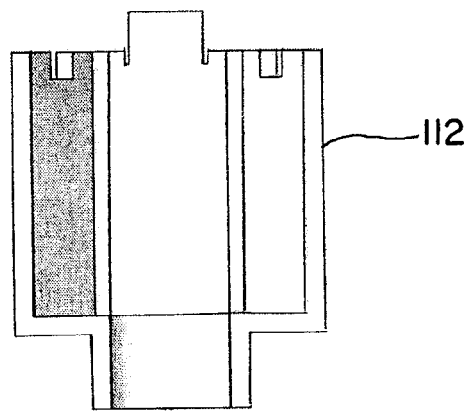
FIG. 8 is a side cross-sectional view of the housing of FIG. 6.

FIGS. 6-8 show an alternative stamped cartridge housing 112. The housing 112 shown in FIGS. 6-8 has a simplified shape that does not use a tapered portion. Inserts or carriers in the housing 112 (not shown in FIGS. 6-8) may be used to facilitate movement of the plungers to selectively engage a threaded rod.

Further, a stamped cartridge housing allows for the possible inclusion of a jaw deactivation feature or disengagement feature that would allow the jaws to disengage from the rod and move the cartridge in opposite direction of the push-to-install feature. Such a feature would be desirable for situations when a large overtravel has occurred along the threaded rod (the rod has been pushed through the locking device farther than they intended). This jaw deactivation feature would also allow for a simpler plunger/jaw geometry; this could also lend itself to a simple method of manufacturing for the plungers/jaws, e.g., powdered metal, stamping, zinc die casting, etc.

In one embodiment of a deactivation features plunger carriers (or the plungers themselves) have wings that extend through slots in the housing. This enables a user to move the carriers by hand to disengage the plungers (jaws) from the threads on the rod, allowing easy adjustment of the rod in either direction.

A hex-shaped housing, in any of the embodiments described herein, would effectively key the plungers, eliminating some complexity on the plunger/jaw design. Incorporating a taper into the housing design eliminates the need to secondarily machine a taper into the body of the housing. Conversely this could also be accomplished by inserting a stamped, cast, or machined conical insert into the housing in lieu of stamping the conical shape into the body directly (so the taper/conical section could be an integral part of the stamped housing or a separate component).

The keyed engagement between the plungers/jaws and the housing allows the entire assembly to rotate, providing a method for making final height adjustment of the assembly. The keyed feature engagement between plungers/jaws and housing ensures the plungers are always in contact with the housing for the entire plunger stroke movement. This prevents the plungers from spinning in such cases, such as when the external threads on the threaded rod are binding with internal threads on the plungers due to damaged external threads, burrs on the external threads, and for hot dip galvanized threaded rod.

The integral lock nut provides an easy means to rigidly hold plungers in a seated/locked position. The plunger/jaw keys and insert keyways are always engaged and keyed for entire plunger stroke movement. The back plate uses a positive mechanical stop without threading/staking process/adding LOCK-TITE thread locker to control its final assembled position. The assembly is not as tolerance sensitive.

The plunger/jaw key can be configured for automation in manufacturing. For example, different key widths could be used for recognition (e.g., a left and right side, would support vibrator feed in assembly).

The annular protrusion on the end of the housing can be riveted over or threaded into a through hole or a threaded mounting surface of another object.

Figure 9:
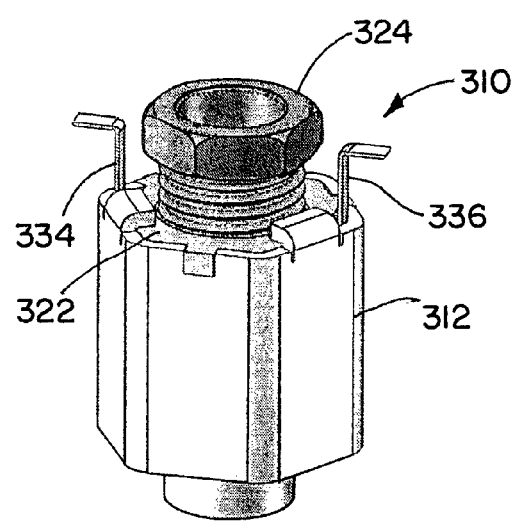
FIG. 9 is an oblique view of a securement device according to an alternate embodiment of the invention.
Figure 10:
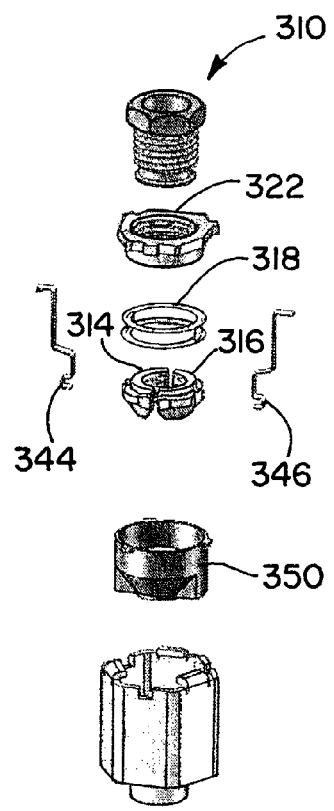
FIG. 10 is an exploded view of the device of FIG. 9.
Figure 11:
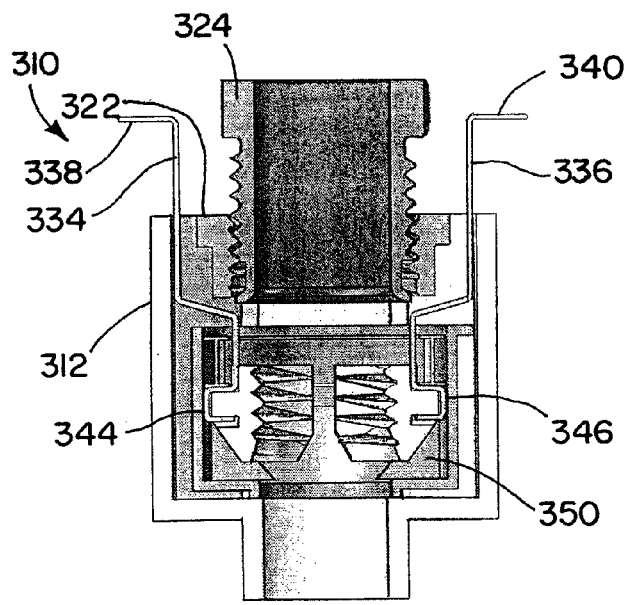
FIG. 11 is a side cross-sectional view of the device of FIG. 9.

FIGS. 9-11 show another alternative housing assembly or device 310, which includes release tabs 334 and 336 as part of a disengagement feature. The release tabs 334 and 336 are bent metal parts that have grips or wings 338 and 340 that protrude from and extend outside of a housing 312. Parts of the tabs 334 and 336 extend into the housing 312, fitting between the housing 312 and a back plate or cap 322. The tabs 334 and 336 have bent end parts 344 and 346 that are secured to ridges on the outsides of plungers 314 and 316. The bent end parts 344 and 346 are used to secure a threaded rod or other cylindrical object within the housing 312. This mechanically links the plungers 314 and 316 with the tabs 334 and 336 such that axial movement of the tabs 334 and 336 moves the plungers 314 and 316 as well.

The release tabs 334 and 336 may be pulled up by the user to release jaws (the plungers 314 and 316) from the threaded rod, allowing easy adjustment of the rod in either direction. Pulling up the release tabs 334 and 336 disengages the plungers 314 and 316 from a carrier 350 that is in the housing 312, moving the plungers 314 and 316 against a spring force from a spring 318.

In other respects the device 310 may be similar to other devices described herein. For instance the device 310 includes a lock screw or nut 324 that threads into the back plate 322.

Other configurations are possible as alternatives. The plunger carrier wings and release tabs are only two examples of possible jaw deactivation mechanisms. The body (housing) could be manufactured from a stamping, zinc die casting, cold heading, or investment casting (or even injection molded for lighter duty applications). The jaws/plungers could be manufactured from a stamping, zinc die casting, powder metal, metal injection molding, plastic, or investment casting (or even injection molded for lighter duty applications). The body shape could be circular, or hexagonal or any other multi-faceted polygonal shape. The exterior of the body could be knurled to allow for hand adjustment, or it could possess just one or more flats for adjustment with a wrench. The taper in the body could be an integral part of the stamping or it could consist of a tapered insert that is placed inside the body of the cartridge. The annular protrusion on the end of the housing can be riveted over or threaded into or onto a through hole or a threaded mounting surface.

Figures 12, 13:
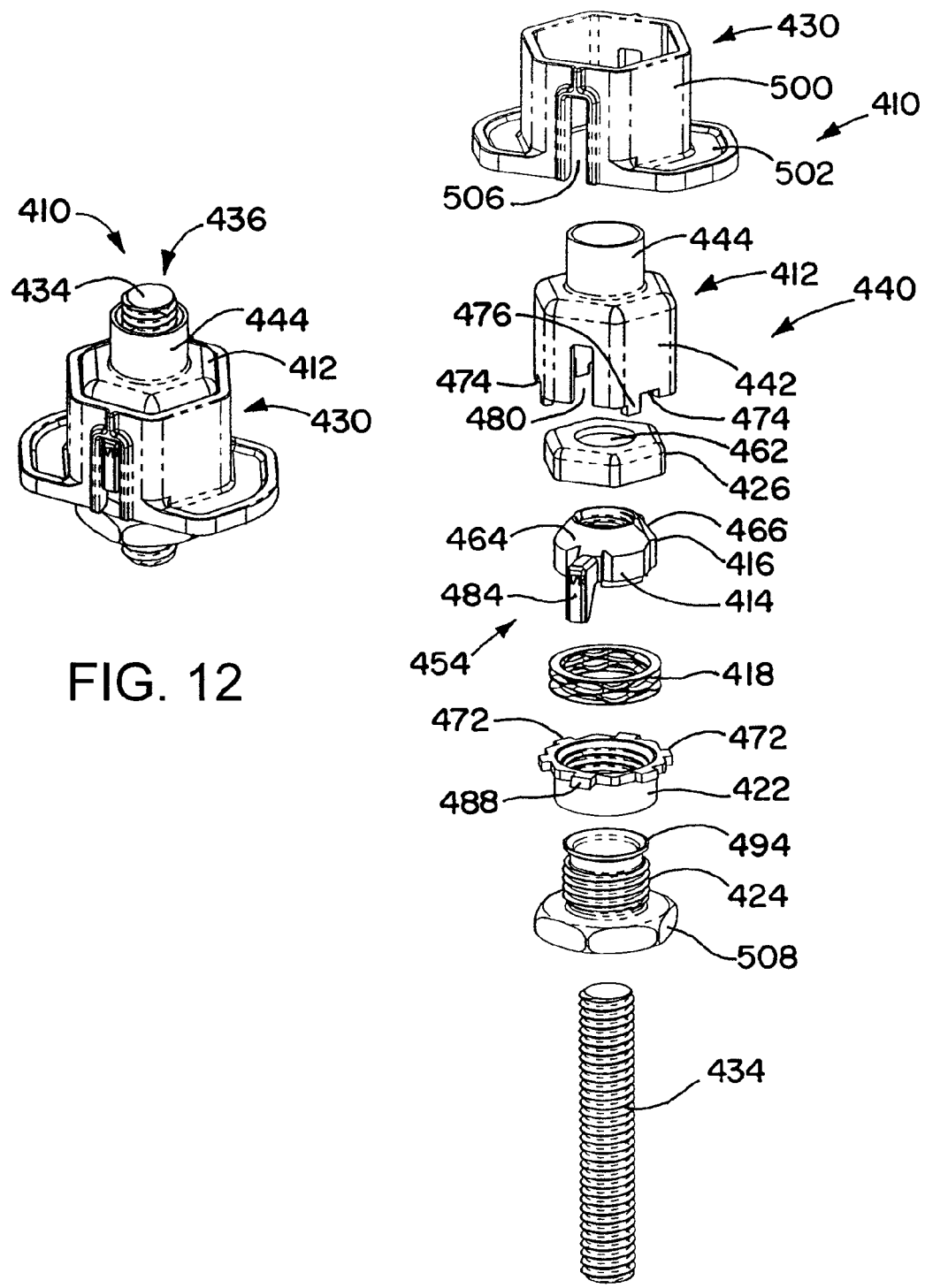
FIG. 12 is an oblique view of a securement device according to another embodiment of the invention.
FIG. 13 is an exploded view of the device of FIG. 12.
Figure 14:
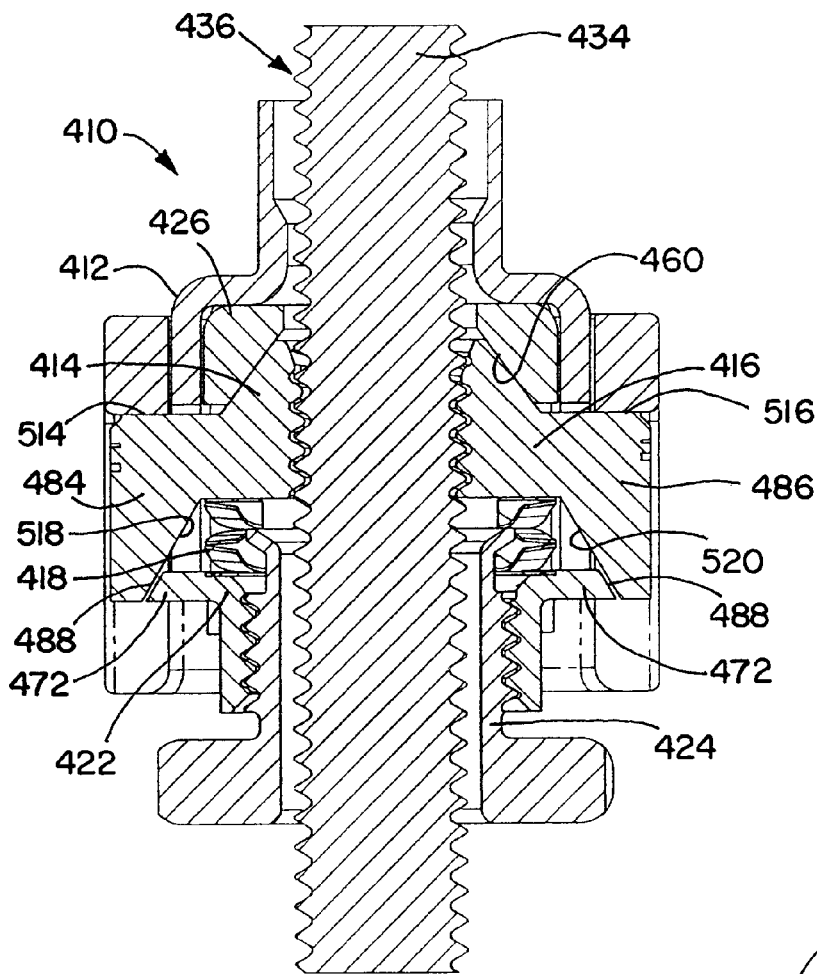
FIG. 14 is a side cross-sectional view of the device of FIG. 12.
Figure 15:
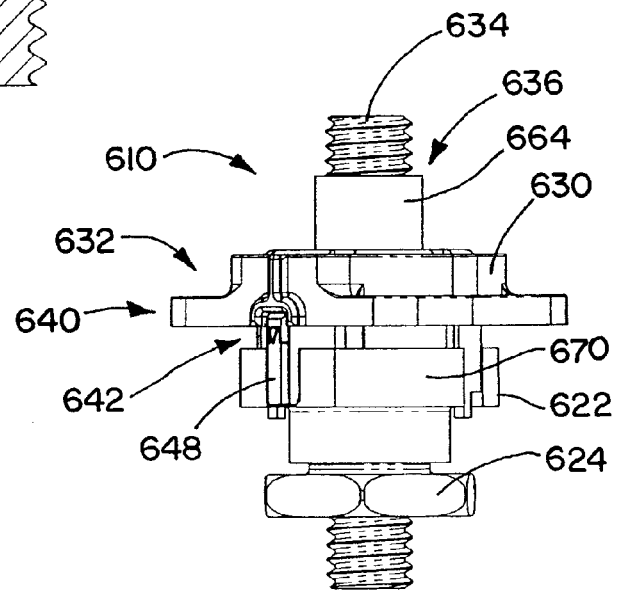
FIG. 15 is an oblique view of a securement device according to yet another embodiment of the invention.

Referring now to FIGS. 12-14, another embodiment securement device 410 is shown. The device 410 includes a housing 412, a pair of plungers (or plunger pieces or jaws) 414 and 416, a spring 418, a back plate or cap 422, a lock nut 424, an insert 426 that fits into the housing 412, and a disengagement tool 430. Many of these parts are similar in at least some functions to the corresponding parts of other embodiments, as described above. For example, the plungers 414 and 416 are used to selectively grip a threaded rod 434 that is inserted into the housing 412, with the spring 418 (for example a wave spring) between the back plate 422 and the plungers 414 and 416 used to push the plungers 414 and 416 away from the back plate 422, and into engagement with the threaded rod 434 to be inserted into a central bore (or through hole) 436 of the device 410. Some of these similar features and/or functions are omitted in the discussion below. As with the other embodiments described herein, the device 10 may be used to secure other sorts of cylindrical objects, such as other rods, or cables or wires. The plungers 414 and 416, and the spring 418, constitute a locking mechanism 440 for securing the threaded rod 434 within the housing 412.

The housing 412 includes a hexagonal housing body 442, with a round hub 444, an annular protrusion emerging from one end of the housing body 442. The housing 412 is a stamped sheet metal housing, with the hub 444 also produced by a stamping process, such as deep draw stamping. The hub 444 may riveted to another part, such as a bracket or a flange. Such connections are shown in co-owned U.S. Patent Publication US 2013/0243545 A1, the figures and description of which are incorporated by reference. As an alternative, the hub 444 may be externally threaded in order to make a connection to another part.

The housing body 442 has a pair of slots on opposite sides, for use as part of a disengagement feature 454 (discussed in greater detail below) that allows a user to disengage the plungers 414 and 416 from a threaded rod that has been inserted into the device 410.

The insert 426 is inserted to the housing body 442, and may have a shape, such as a hexagonal shape, that corresponds to the shape of the volume defined by the body 442. As best seen in FIG. 17, the insert 426 has a sloped or conical surface 460, around a central hole 462. The sloped surface 460 is configured to engage corresponding respective sloped outer surfaces 464 and 466 of the plungers 414 and 416. The surface 460 is used to urge the plungers 414 and 416 radially inward to clamp the threaded rod, when the outer plunger surfaces 464 and 466 are pressed against the sloped insert surface 460. The insert 426 may be made of any of a variety of suitable materials, such as steel or another metal.

The back plate 422 includes a series of radially-extending tabs 472 that fit into corresponding notches 474 along the bottom edge of the housing body 442. The back plate 422 is retained in the housing 412 by folding over of a series of axially-extending tabs 476 of the housing 412. This is similar to the engagement mechanism of the device 10 (FIG. 2), discussed above.

The insert 426 is inserted to the housing body 442, and may have a shape, such as a hexagonal shape, that corresponds to the shape of the volume defined by the body 442. As best seen in FIG. 14 the insert 426 has a sloped or conical surface 460, around a central hole 462. The sloped surface 460 is configured to engage corresponding respective sloped outer surfaces 464 and 466 of the plungers 414 and 416. The surface 460 is used to urge the plungers 414 and 416 radially inward to clamp the threaded rod, when the outer plunger surfaces 464 and 466 are pressed against the sloped insert surface 460. The insert 426 may be made of any of a variety of suitable materials, such as steel or another metal.

The wings 484 and 486 also function as keying features, maintaining the plungers 414 and 416 is a desired circumferential orientation relative to the housing 412. The wings 484 and 486 prevent the plungers 414 and 416 from moving circumferentially relative to the housing 412, even when the outer shape of the plungers 414 and 416 is not keyed to the shape of the recess within the housing 412. Thus the plungers 414 and 416 may together make an annular shape with the hexagonal housing 412, with the wings 484 and 486 preventing rotation of the plungers 414 and 416 within and relative to the housing 412. The housing 412 and the plungers 414 and 416 can therefore be easily rotated as a unit about the longitudinal axis of the device 410. This allows height adjustment of the device 410 along the threaded rod 434, by rotation of the housing 412 about the threaded rod 434, using the engagement of the threads of the rod 434 with the inner surfaces of the plungers 414 and 416 to effect the height adjustment. This advantageously avoids the need for a complex geometry of the plungers 414 and 416 for keying them more directly to the geometry of the housing 412.

The tabs 472 that are in the slots 480 have sloped cam surfaces 488 on their outer edges, which interact with the wings 484 and 486 to facilitate the disengagement of the plungers 414 and 416. The sloped cam surfaces 488 and the engaging surfaces of the wings 484 and 486 are all sloped surfaces, angled at nonzero angles (such as between 15 and 75 degrees) to both the axial direction and the radial direction.

The lock nut 424 is threaded into the back plate 422. The lock nut 424 has an outward-bent lip 494 on the part of the lock nut 424 that is inserted furthest into the housing 412. The lip 494 is formed after threaded engagement of the lock nut 424 and the back plate 422. The lip 494 is bent outward far enough to act as a retainer, preventing complete disengagement of the lock nut 424 from the back plate 422. This helps avoid loss of the lock nut 424 during or after installation.

The disengagement tool 430 has a tool body 500, and a platform 502 that acts as a base for the tool body 500. The tool body 500 is hollow and has a hexagonal shape, allowing it to fit around the housing body 442, encircling or surrounding the body 442. A pair of slots 506 in the tool body 500 correspond in location to the slots 480 in the housing body 442. The plunger wings 484 and 486 pass through both the housing slots 480 and the tool slots 506. The tool 430 may be made of a suitable plastic, or another suitable material. Possible alternatives to plastic include zinc or aluminum (e.g., by die casting), or iron or steel (e.g., by investment casting or metal injection molding).

Pressing downward on the disengagement tool 430 (moving the disengagement tool 430 toward the lock nut 424) releases the plungers 414 and 416 by moving the plungers 414 and 416 radially outward. This pressing may be accomplished by a user placing fingers and thumbs on the platform 502 and the wide base 508 of the lock nut 424, and squeezing, to bring the tool 430 toward the base 508. As this is done, the closed ends of the tool slots 506 eventually contact the upper surfaces 514 and 516 of the plunger wings 484 and 486. This causes the plungers 414 and 416 to move downward as well. As this happens lower sloped surfaces 518 and 520 of the plunger wings 484 and 486 slide across the sloped cam surfaces 488 of the back plate tabs 472 that are in the housing slots 480. This cam action causes the plungers 414 and 416 to move radially outward, disengaging the plungers 414 and 416 from a threaded rod 434 that had been placed in the bore 436 of the device 410.

FIGS. 15-18 show another embodiment, a securement device 610. Many of the features of the device 610 are similar to those of the device 410 (FIG. 15), and the description below will focus on the differences between the two devices. The device 610 has a housing 612, plungers 614 and 616, a spring 618, an end cap (back plate) 622 that functions to close off an end of the housing 612, a lock nut 624, an insert 626, and a disengagement tool 630. The tool 630 is part of a disengagement feature 632 for disengaging the plungers 614 and 616 from a threaded rod 634 that is in a central bore 636 of the device 610. The plungers 614 and 616, and the spring 618, constitute a locking mechanism 640 for securing the threaded rod 634 within the housing 612. As an alternative to the threaded rod 634, other sorts of cylindrical objects may be inserted into the device 610 and secured by the device 610.

The tool 630 has a shorter body than the tool 430 (FIG. 15), but otherwise functions similarly. The tool 630 includes a pair of notches (shallow slots) 642, corresponding in location to slots 644 in the housing 612. The notches 642 engage upper surfaces of the plunger wings 648 and 650, which protrude out of the housing 612 through the housing slots 644. Pushing the tool 630 downward pushes the plungers 614 and 616 downward as well. This causes the plungers 614 and 616 to open up by moving radially outward, as the lower wing surface 654 and 656 engage corresponding cam surfaces 658 and 660 on the end cap 622.

The housing 612 does not have a hub. Instead a hub 664 is on the insert 626. The hub 664 protrudes through a hole 668 at the top of the housing 612. The inclusion of a hub on the insert 626 instead of the housing 612 simplifies manufacture of the housing 612, although it may also complicate the manufacture of the insert 626. The hub 664 may be used for a riveted or threaded connection.

The end cap 622 has a ridge 670 that extends around the outside surface of the housing 612. Tabs 672 on the housing 612 fit into corresponding openings in the end cap 622. The tabs 672 may then be bent to secure the end cap 622 on the housing 612.

FIG. 19 shows a blank 680 that may be used to form the housing 612. The blank 680 has a number of cutouts 682 at corners where pairs of adjacent sides 684 come together at a top 686. The cutouts 682 may be round, for example with a radius of 1.27 mm (0.05 inches) where the blank material is removed. The sides 684 have respective tabs or ears 690, and notches 692 for receiving the tabs 690. When the blank 680 is folded to make the housing 612, the tabs 690 each engage one of the notches 692 (on an adjacent of the sides 684), as shown in FIG. 20. This engagement of different parts of the sides 684 (along the seams where the sides 684 meet one another) improves the structural integrity of the housing 612. The construction of the housing 612 from the blank 680 allows use of progressive die manufacturing, which can save costs relative to other methods, such as deep-draw stamping.

The various securement devices described above could be part of a device to secure a cylindrical object (such as a threaded rod) to a bracket (such as an angle bracket or a bracket to support ductwork or a cable tray), a loop hanger or clevis hanger, a nut, a strut/channel nut, a strut/metal formed channel, a strut end bracket, a rod coupler, a beam clamp, a concrete anchor screw, or a preset concrete anchor. Any of these various attachment mechanisms for attaching the securement device to another object or structure could be mechanically coupled to the housing of a securement.

Figure 21:
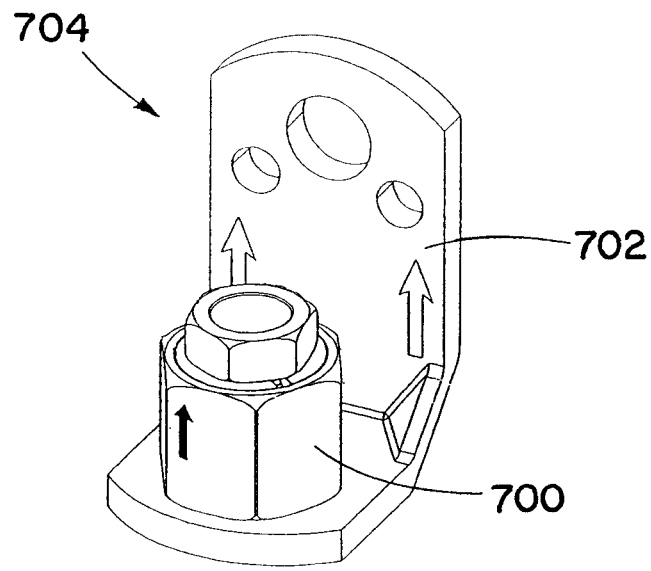
FIG. 21 is an oblique view of a first attachment that includes a securement device, according to an embodiment of the invention.
Figure 22:
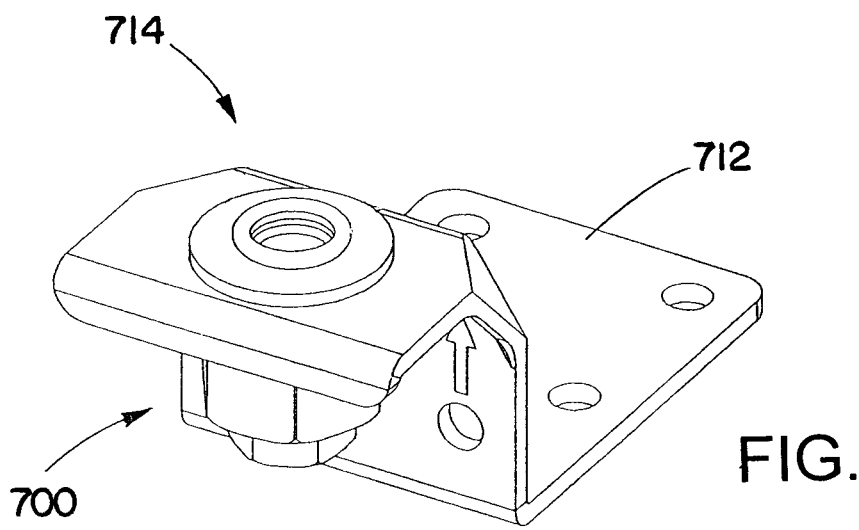
FIG. 22 is an oblique view of a second attachment that includes a securement device, according to an embodiment of the invention.
Figure 23:
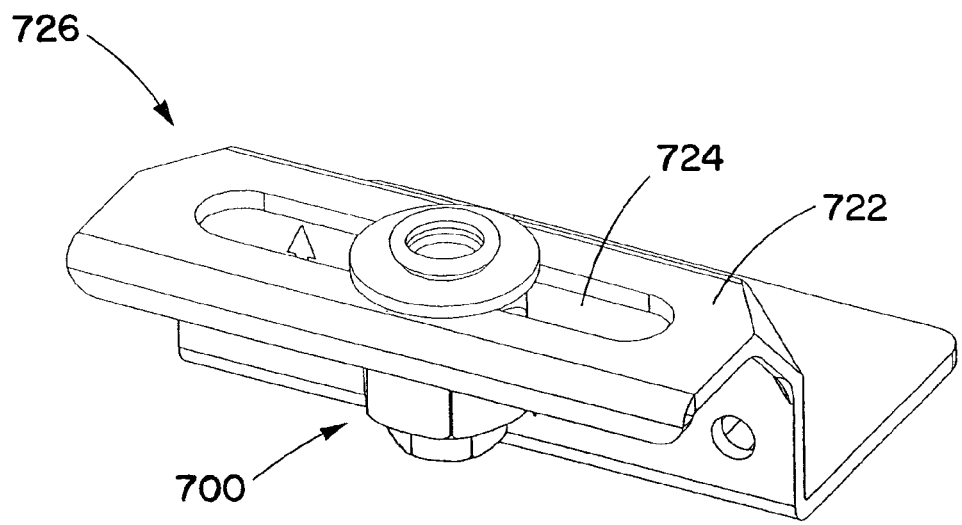
FIG. 23 is an oblique view of a third attachment that includes a securement device, according to an embodiment of the invention.
Figure 24:
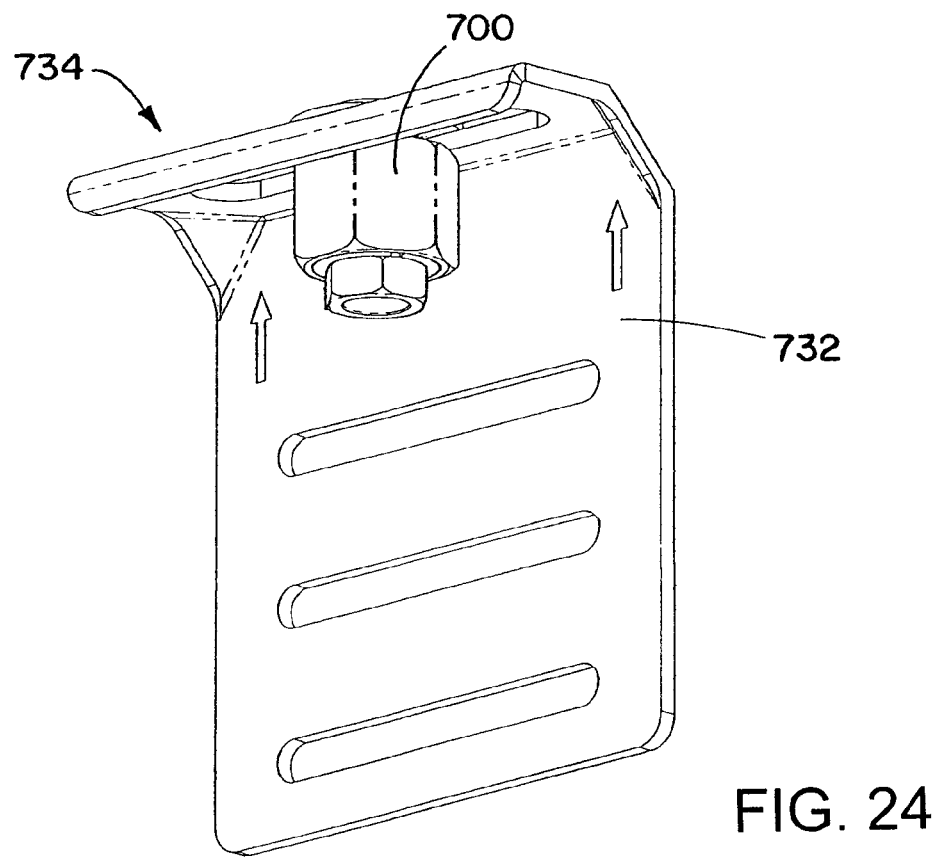
FIG. 24 is an oblique view of a fourth attachment that includes a securement device, according to an embodiment of the invention.
Figure 25:
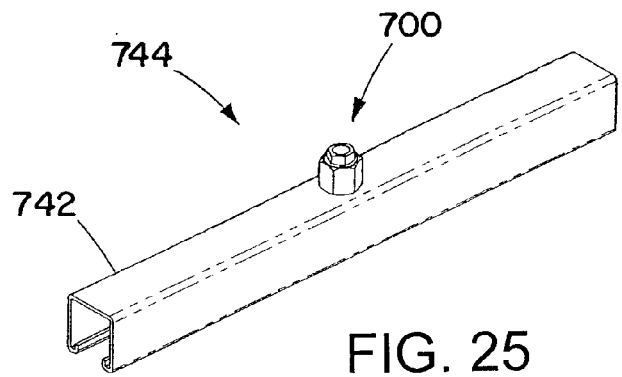
FIG. 25 is an oblique view of a fifth attachment that includes a securement device, according to an embodiment of the invention.
Figure 26:
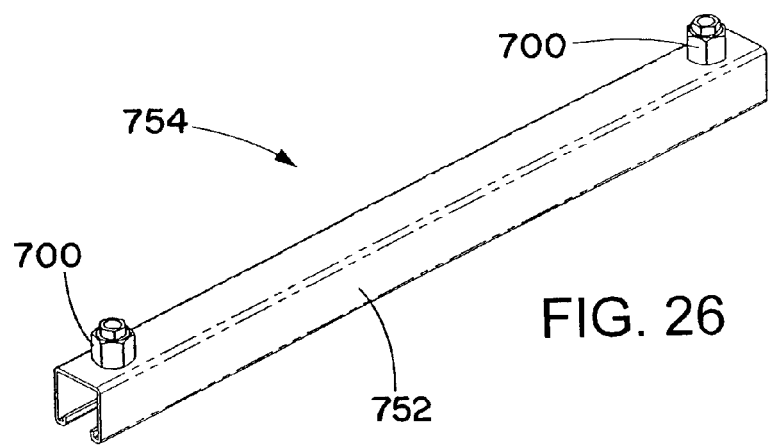
FIG. 26 is an oblique view of a sixth attachment that includes a securement device, according to an embodiment of the invention.
Figure 27:
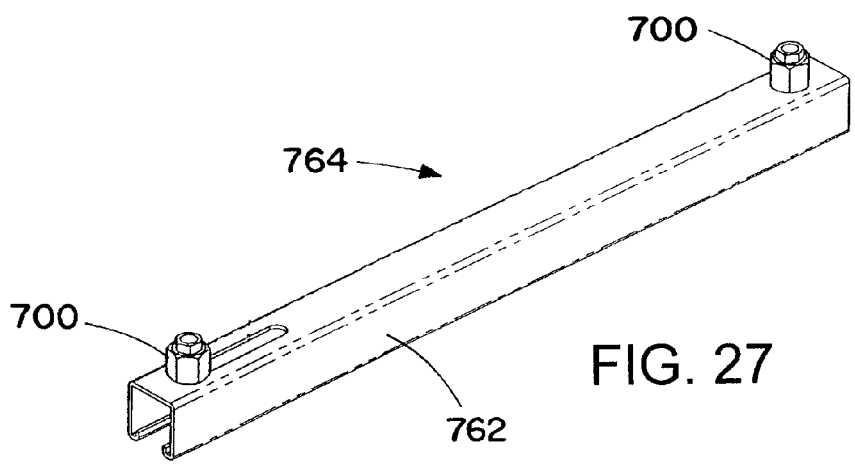
FIG. 27 is an oblique view of a seventh attachment that includes a securement device, according to an embodiment of the invention.
Figure 28:
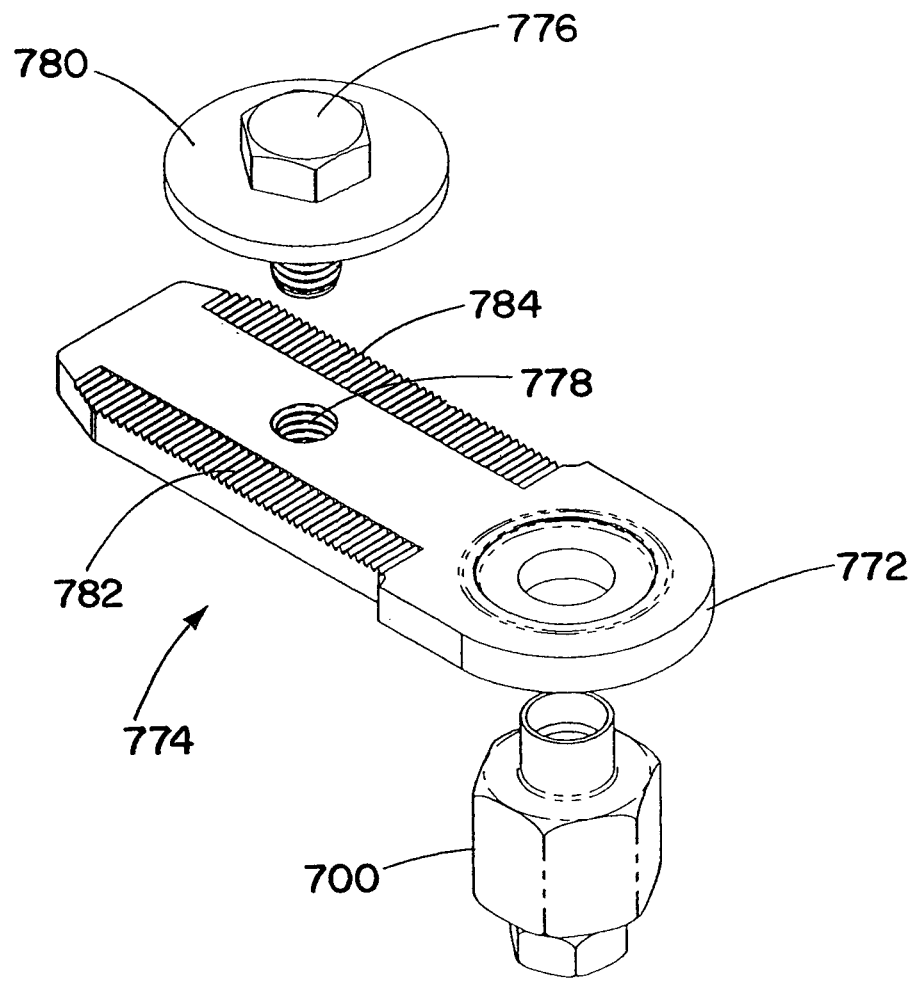
FIG. 28 is an exploded view of an eighth attachment that includes a securement device, according to an embodiment of the invention.

FIGS. 21-28 show examples of a securement device 700 (representing any of the various embodiments described above) as part of a hanger or attachment for attaching to another object, such as building structure, or components of any various types. FIG. 21 shows the securement device 700 coupled to a bracket 702, as part of a bracket attachment 704. FIG. 22 shows the device 700 coupled to a bracket 712, as part of a bracket attachment 714. FIG. 23 shows the device 700 slidingly coupled to a bracket 722, able to slide along a slot 724, as part of a bracket attachment 726. FIG. 24 shows another bracket 732, with the device 700 able to slide along a slot 734, as part of a bracket attachment 736. FIG. 25 shows the device 700 secured to the center of a strut 742, as part of a strut attachment 744. FIG. 26 shows two of the devices 700 secured at opposite ends of a strut 752, as parts of a strut attachment 754. FIG. 27 shows a variation on this theme, with one of the devices 700 slidingly coupled to one end of a strut 762, and the other devices 700 fixedly connected to the other end of the strut 762, all as part of a strut attachment 764. FIG. 28 shows a threaded rod securement 774 that uses the device 700 that is coupled to a planar housing 772, for engaging a strut or channel. A screw 776 engages a threaded hole 778. The screw 778 is used to press a washer 780 against the tops of the strut rails, to clamp the securement 774 in place, with the strut rails between the washer 780 and the serrations 782 and 784. The device 700 in all of the various embodiments in FIGS. 21-28 may be riveted to mechanically couple it to the other parts, for example using a hub of the device 700, with or without a washer that aids in securing the hub after the hub passes through a hole or slot. Further details regarding certain aspects of these attachment embodiments may be found in U.S. Patent Publication US 2013/0243545 A1.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A securement device for a cylindrical object, the securement device comprising:
    a housing having a through hole therethrough, for receiving the cylindrical object therein;
    a locking mechanism that includes:
        plungers that are movable within the housing to selectively clamp the cylindrical object, when the cylindrical object is inserted into the housing via the through hole; and
        a spring within the housing to provide a spring force to bias the plungers toward one end of the housing, to engage the plungers with the cylindrical object within the housing; and
    a back plate at one end of the housing, with the spring between the back plate and the plungers;
    the locking mechanism including a disengagement feature that includes wings that protrude from the housing; and
    the wings being configured to slide relative to the housing, with
    sliding of the wings relative to the housing in an axial direction moving the plungers radially outward to disengage the cylindrical object within the housing.

2. The securement device of claim 1, wherein the wings are parts of the plungers.

3. The securement device of claim 2, wherein the plungers together correspond in shape to a recess within the housing, and the wings protrude radially from the centers of the respective plungers.

4. The securement device of claim 1, wherein the sliding of the wings in the axial direction engages surfaces of the wings with cam surfaces of the back plat to move the plungers radially outward.

5. The securement device of claim 4, wherein the surfaces of the wings and the cam surfaces are sloped surfaces, angled at nonzero angles to both the axial direction and a radial direction.

6. The securement device of claim 1, further comprising a lock nut that threadedly engages the back plate, wherein the lock nut is threadable into the back plate to engage the plungers to lock the plungers in place, preventing disengagement of the plungers from a cylindrical object that has been inserted into the securement device.

7. The securement device of claim 6, wherein the lock nut has a flared portion for retaining the lock nut on the back plate, preventing the lock nut from being completely disengaged from the back plate.

8. The securement device of claim 6; wherein the back plate is secured to the housing using folded-over tabs of the housing.

9. The securement device of claim 1, wherein the housing is a stamped or deep drawn metal housing.

10. The securement device of claim 1, wherein the housing has a hexagonal cross-sectional shape.

11. The securement device of claim 1, further comprising an insert within the housing, wherein the insert has a conical surface that engages the plungers to urge the plungers radially inward.

12. The securement device of claim 1, wherein the plungers have textured inner surfaces for engaging the cylindrical object.

13. The securement device of claim 1, wherein the wings pass through slots in the housing.

14. The securement device of claim 1, further comprising a disengagement tool disposed around the housing, the disengagement tool being configured to slide relative to the housing in the axial direction;
    wherein the disengagement tool selectively engages the wings to move the plungers.

15. The securement device of claim 14, wherein the disengagement tool is made of plastic.

16. A securement device for a cylindrical object, the securement device comprising:
    a housing having a through hole therethrough, for receiving the cylindrical object therein;
    a locking mechanism that includes:
        plungers that am movable within the housing to clamp the cylindrical object, when the cylindrical object is inserted into the housing via the through hole; and
        a spring within the housing to provide a spring force to bias the plungers toward one end of the housing, to engage the plungers with the cylindrical object within the housing; and
    a disengagement tool disposed around the housing, the disengagement tool being configured to slide relative to the housing in an axial direction that is along an axis of the housing, to move the plungers radially outward, away from the axis of the housing.

17. The securement device of claim 16, wherein the disengagement tool interacts with wings of the plungers that protrude from the housing.

18. The securement device of claim 16, wherein the housing is a stamped or deep drawn housing.

19. A securement device for a cylindrical object, the securement device comprising:

a housing having a through hole therethrough, for receiving the cylindrical object therein;

a locking mechanism that includes:
  plungers movable within the housing to selectively clamp the cylindrical object, when the cylindrical object is inserted into the housing via the through hole; and
  a spring within the housing to provide a spring force to bias the plungers toward one end of the housing, for engaging the plungers with the cylindrical object within the housing;

a back plate at one end of the housing, with the spring between the back plate and the plungers; and a lock nut that threadedly engages the back plate, the lock nut being threadable into the back plate to engage the plungers to lock the plungers in place, to prevent disengagement of the plungers from the cylindrical object within the housing;

the lock nut having a flared portion to retain the lock nut on the back plate, to prevent the lock nut from being completely disengaged from the back plate.

20. The securement device of claim 19, further comprising:
  a disengagement tool that is slidable relative to the housing;
  wherein the plungers include wings that protrude from the housing; and
  wherein sliding the disengagement tool relative to the housing engages the wings to cause the plungers to move radially away from the cylindrical object within the housing.

* * * * *